(12) United States Patent
Lee

(10) Patent No.: US 11,202,091 B2
(45) Date of Patent: Dec. 14, 2021

(54) METHOD FOR ENCODING/DECODING A QUANTIZATION COEFFICIENT, AND APPARATUS USING SAME

(71) Applicant: Facebook, Inc., Menlo Park, CA (US)

(72) Inventor: Sun Young Lee, Seoul (KR)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 16/224,032

(22) Filed: Dec. 18, 2018

(65) Prior Publication Data

US 2019/0149835 A1     May 16, 2019

Related U.S. Application Data

(63) Continuation of application No. 14/356,218, filed as application No. PCT/KR2012/008999 on Oct. 30, 2012, now abandoned.

(30) Foreign Application Priority Data

Nov. 4, 2011     (KR) .................. 10-2011-0114687

(51) Int. Cl.
*H04N 19/91*     (2014.01)
*H04N 19/463*     (2014.01)

(52) U.S. Cl.
CPC .......... *H04N 19/463* (2014.11); *H04N 19/91* (2014.11)

(58) Field of Classification Search
None
See application file for complete search history.

(56) References Cited

U.S. PATENT DOCUMENTS

| | | | |
|---|---|---|---|
| 6,301,393 B1* | 10/2001 | Spaulding | G06T 11/001 345/590 |
| 2002/0094127 A1 | 7/2002 | Mitchell | |
| 2007/0153892 A1 | 7/2007 | Yin et al. | |
| 2010/0086028 A1 | 4/2010 | Tanizawa et al. | |
| 2011/0150072 A1 | 6/2011 | Han | |
| 2011/0200115 A1* | 8/2011 | Hayashi | H04N 19/176 375/240.24 |

(Continued)

FOREIGN PATENT DOCUMENTS

| | | |
|---|---|---|
| KR | 10-2007-0001112 | 1/2007 |
| KR | 10-2009-0115176 | 11/2009 |

(Continued)

OTHER PUBLICATIONS

International Search Report for PCT/KR2012/008999 dated Feb. 27, 2013.

(Continued)

*Primary Examiner* — Mikhail Itskovich
(74) *Attorney, Agent, or Firm* — FisherBroyles, LLP

(57) ABSTRACT

The present invention relates to a method for encoding/decoding a quantization coefficient, and to an apparatus using same. The decoding method can include the steps of: decoding initial quantization parameter information and quantization parameter range information of a slice; and obtaining a quantization parameter limitation range applied to an encoding unit included in the slice using the initial quantization parameter information and the quantization parameter range information. Accordingly, the efficiency of encoding and decoding an image can be improved during encoding/decoding.

3 Claims, 6 Drawing Sheets

(56) References Cited

U.S. PATENT DOCUMENTS

2013/0136172 A1* 5/2013 Lim .................. H04N 19/124
375/240.03
2014/0348227 A1 11/2014 Lee

FOREIGN PATENT DOCUMENTS

| KR | 10-0930485 | | 12/2009 |
| KR | 10-2010-0004009 | | 1/2010 |
| KR | 10-2011-0071231 | | 6/2011 |
| KR | 10-2013-0049587 | A | 5/2013 |
| WO | 2013/066026 | A1 | 5/2013 |

OTHER PUBLICATIONS

Non-Final Office Action received for U.S. Appl. No. 14/356,218 dated Apr. 13, 2016, 22 pages.

Final Office Action received for U.S. Appl. No. 14/356,218 dated Oct. 27, 2016, 15 pages.

Non-Final Office Action received for U.S. Appl. No. 14/356,218 dated Mar. 30, 2017, 19 pages.

Final Office Action received for U.S. Appl. No. 14/356,218 dated Oct. 23, 2017, 19 pages.

Non-Final Office Action received for U.S. Appl. No. 14/356,218 dated Feb. 21, 2018, 18 pages.

Final Office Action received for U.S. Appl. No. 14/356,218 dated Sep. 18, 2017, 24 pages.

Notification of Reason for Refusal received for Korean Patent Application Serial No. 10-2011-0114687 dated Sep. 11, 2018, 6 pages (Including English Translation).

Grant of Patent received for Korean Patent Application Serial No. 10-2011-0114687 dated Mar. 26, 2019, 2 pages (Including English Translation).

International Preliminary Report on Patentability received for PCT Application Serial No. PCT/KR2012/008999 dated, May 15, 2014, 6 pages.

\* cited by examiner

METHOD FOR ENCODING/DECODING A QUANTIZATION COEFFICIENT, AND APPARATUS USING SAME

CROSS-REFERENCE TO RELATED APPLICATIONS

This application is a continuation of U.S. patent application Ser. No. 14/356,218 filed on May 5, 2014, which is the National State Entry of international Application No. PCT/KR2012/008999, filed on Oct. 30, 2012, and claims priority from and the benefit under 35 USC § 119(a) of Korean Patent Application No. 10-2011-0114687 filed on Nov. 4, 2011, all of which are incorporated by reference for all purposes as if fully set forth herein.

BACKGROUND

Field

The present invention relates to a method of encoding/decoding a quantization parameter and an apparatus using the same, and more particularly, to an encoding/decoding apparatus and an encoding/decoding method.

Discussion of the Background

Recently, demands for high-resolution and high-quality videos, such as high-definition (HD) and ultrahigh-definition (UHD) videos, have increased in various fields of applications. As video data has higher resolution and higher quality, the amount of data more increases relative to existing video data. Accordingly, when video data is transferred using media such as existing wired and wireless broad band lines or is stored in existing storage media, transfer cost and storage cost increase. In order to solve these problems occurring with an increase in resolution and quality of video data, high-efficiency video compression techniques may be utilized.

Video compression technology include various techniques, such as an inter prediction technique of predicting pixel values included in a current picture from previous or subsequent pictures of the current picture, an intra prediction technique of predicting pixel values included in a current picture using pixel information in the current picture, and an entropy encoding technique of assigning a short code to a value with a high appearance frequency and assigning a long code to a value with a low appearance frequency. Video data may be effectively compressed and transferred or stored using such video compression techniques.

SUMMARY

An aspect of the present invention is to provide a method of decoding a quantization parameter for improving video encoding efficiency.

Another aspect of the present invention is to provide an apparatus that performs a method of decoding a quantization parameter for improving video encoding efficiency.

An embodiment of the present invention provides a decoding method which is includes decoding initial quantization parameter information and quantization parameter range information on a slice, and deriving a quantization parameter limit range applied to a coding unit included in the slice using the initial quantization parameter information and the quantization parameter range information on the slice. The decoding method may further include decoding basic quantization parameter information on the slice. The initial quantization parameter information may be a value obtained by adding changed slice quantization parameter information to basic quantization parameter information or subtracting the changed slice quantization parameter information from the basic quantization parameter information, or a value included in a slice header. The quantization parameter limit range may be from a value obtained by subtracting the quantization parameter range information from the initial quantization parameter information to a value obtained by adding the quantization parameter range information to the initial quantization parameter information. The decoding method may further include determining a variable-length code table based on the quantization parameter limit range of the coding unit and previous quantization parameter information on the coding unit and decoding a quantization parameter of the coding unit using the variable-length code table. The previous quantization parameter information on the coding unit may include at least one of quantization parameter information on a coding unit decoded before the coding unit, quantization parameter information on a left coding unit of the coding unit and the initial quantization parameter information on the slice. The determining the variable-length code table based on the quantization parameter limit range of the coding unit and the previous quantization parameter information on the coding unit and decoding the quantization parameter of the coding unit using the variable-length code table may include selecting a previously stored variable-length code table based on quantization parameter limit range and the previous quantization parameter information on the coding unit or creating a variable-length code table based on the quantization parameter limit range and the previous quantization parameter information on the coding unit. The decoding method may further include determining whether to change a quantization parameter value of the coding unit. The determining whether to change the quantization parameter value of the coding unit may include determining whether to change the quantization parameter value of the coding unit based on information on whether a quantization parameter of the coding unit is changed or depth information on a coding unit where a quantization parameter is changed.

Another embodiment of the present invention provides a decoding apparatus which include an entropy decoding module to decode a quantization parameter variable and a dequantization module to derive a quantization parameter limit range applied to a coding unit included in a slice based on the quantization parameter variable decoded by the entropy decoding module. The dequantization module may derive the quantization parameter limit range applied to the coding unit comprised in the slice using initial quantization parameter information and quantization parameter range information on the slice. The dequantization module may determine a variable-length code table based on the quantization parameter limit range of the coding unit and previous quantization parameter information on the coding unit and performs dequantization based on a quantization parameter of the coding unit derived using the variable-length code table. The variable-length code table may include a previously stored variable-length code table determined based on quantization parameter limit range and the previous quantization parameter information on the coding unit or a variable-length code table created based on the quantization parameter limit range and the previous quantization parameter information on the coding unit. The dequantization module may include a quantization parameter derivation module to derive the quantization parameter limit range of the coding unit and previous quantization parameter information on the coding unit based on the quantization parameter variable provided from the entropy decoding module. The dequantization module may further include a variable-length code table determination module to determine a variable-length code table for decoding a quantization parameter of the coding unit based on the quantization parameter limit range of the coding unit and previous quantization parameter information on the coding unit derived by the quantization parameter derivation module; and a dequantization implementation module to perform dequantization based on the variable-length code table determined by the variable-length code table determination module.

As described above, according to methods of encoding/decoding a quantization parameter and apparatuses using the methods, a variable-length code table is used in decoding a quantization parameter, thereby improving encoding and decoding efficiencies.

DETAILED DESCRIPTION OF THE ILLUSTRATED EMBODIMENTS

Figure 1:
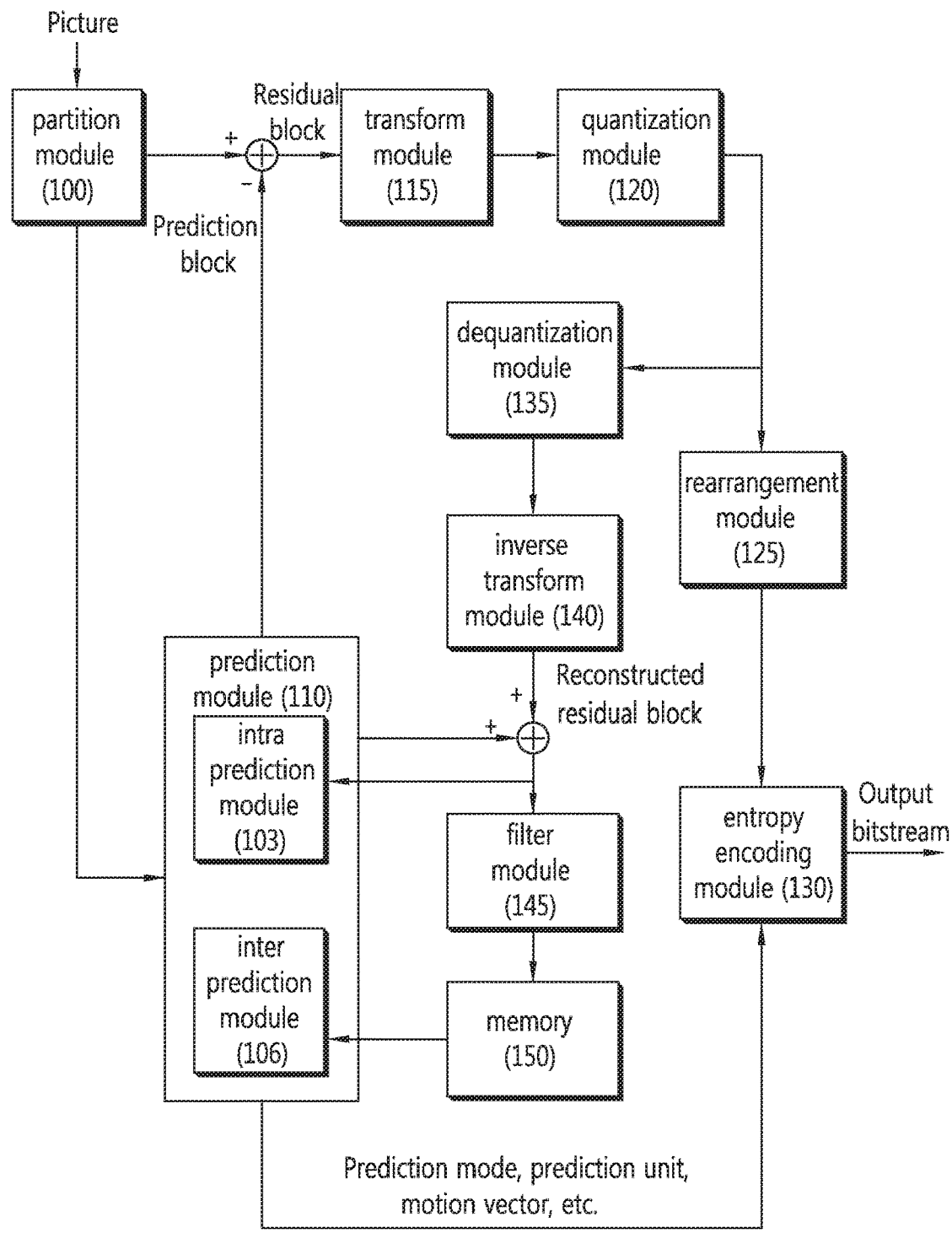
FIG. 1 is a block diagram illustrating an encoding apparatus according to an exemplary embodiment of the present invention.

Although elements illustrated in the drawings are independently shown so as to represent different distinctive functions in a video encoding apparatus, such a configuration does not indicate that each element is constructed by a separate hardware constituent or software constituent. That is, the elements are independently arranged for convenience of description, wherein at least two elements may be combined into a single element, or a single element may be divided into a plurality of elements to perform functions. It is to be noted that embodiments in which some elements are integrated into one combined element and/or an element is divided into multiple separate elements are included in the scope of the present invention without departing from the essence of the present invention.

Some elements are not essential to the substantial functions in the invention and may be optional constituents for merely improving performance. The invention may be embodied by including only constituents essential to embodiment of the invention, except for constituents used to merely improve performance. The structure including only the essential constituents except for the optical constituents used to merely improve performance belongs to the scope of the invention.

FIG. 1 is a block diagram illustrating an encoding apparatus according to an exemplary embodiment of the present invention.

Referring to FIG. 1, the video encoding apparatus 100 may include a partition module 100, a prediction module 110, an intra prediction module 103, an inter prediction module 106, a transform module 115, a quantization module 120, a rearrangement module 125, an entropy encoding module 130, a dequantization module 135, an inverse transform module 140, a filter module 145 and a memory 150.

The encoding apparatus may be realized by a video encoding method to be described in the following exemplary embodiment of the present invention, while operations of some components may not be performed so as to reduce complexity of the encoding apparatus or to achieve quick real-time encoding. For example, when performing intra prediction, the prediction module may select one final intra prediction mode among a limited number of intra prediction modes so as to perform encoding in real time instead of using all intra prediction modes to select an optimal intra encoding method. Alternatively, in performing intra prediction or inter prediction, a shape of a prediction unit may be restricted.

A unit of a block processed by the encoding apparatus may be a coding unit for performing coding, a prediction unit for performing prediction or a transform unit for performing transformation. A coding unit may be represented by a CU, a prediction unit by a PU, and a transform unit by a TU.

The partition module 100 may divide one picture into a plurality of combinations of a CU, a PU and a TU and select one combination of a CU, a PU and a TU on the basis of a predetermined criterion, for example, a cost function. For instance, a recursive tree structure, such as a quadtree structure, may be used to partition the picture into CUs. Hereinafter, a CU may be used to refer to not only a unit of encoding but also a unit of decoding.

A PU may be a unit for intra prediction or a unit for inter prediction. A unit for intra prediction may have a square shape, such as 2N×2N and N×N, or a rectangular shape using short distance intra prediction (SDIP). A unit for inter prediction may include 2N×2N and N×N square units, 2N×N and N×2N units obtained by equally partitioning a square PU in two, or PUs obtained by asymmetric motion partitioning (AMP). The transform module 115 may use a different transform method based on a shape of a PU.

The prediction module 110 may include the intra prediction module 103 to perform intra prediction and the inter prediction module 106 to perform inter prediction. The prediction module 110 may determine whether to employ intra prediction or inter prediction for a PU. A processing unit for performing prediction may be different from a processing unit for determining a prediction method and details on the prediction method. For example, in performing intra prediction, a prediction mode may be determined by PU while prediction may be performed by TU. A residual value (residual block) between a generated prediction block and an original block may be input to the transform module 115. Also, information on a prediction mode and a motion vector used for prediction may be encoded along with the residual value by the entropy encoding module 130 and transferred to the decoding apparatus.

When a pulse-code modulation (PCM) encoding mode is used, the original block may be encoded and transferred to the decoding apparatus as it is without performing prediction by the prediction module 110.

The intra prediction module 103 may generate a PU based on a reference pixel neighboring a current PU. In order to derive an optimal intra prediction mode for the current PU, the intra prediction module 103 may use a plurality of intra prediction modes to generate the current PU and select one of the modes. Intra prediction modes may include a directional prediction mode in which reference pixel information is used according to a prediction direction and a non-directional prediction mode in which directivity information is not used in performing prediction. A mode for predicting luma information and a mode for predicting chroma information may be different from each other. Intra prediction mode information used to obtain luma information or predicted luma signal information may be used to predict chroma information.

Information on the one selected intra prediction mode of an intra prediction unit, that is, the intra prediction mode of the current PU, may be encoded using a method of predicting an intra prediction mode of a current PU from information on an intra prediction mode of a neighboring block of the current PU. That is, the intra prediction mode of the current PU may be predicted from an intra prediction mode of a PU neighboring the current PU. In predicting the prediction mode of the current PU using mode information predicted from a neighboring PU, when the current PU and the neighboring PU have the same intra prediction mode, information indicating that the current PU and the neighboring PU have the same prediction mode may be transmitted using flag information. When the current PU and the neighboring PU have different prediction modes, information on the prediction mode of the current block may be encoded by entropy encoding. When a neighboring prediction mode is unavailable, a preset intra prediction mode value may be set as a candidate intra prediction mode value to predict the intra prediction mode of the current PU.

The intra prediction module 103 may generate a PU on the basis of information on a reference pixel neighboring the current block, that is, information on a pixel within a current picture. When a block neighboring the current PU is a block having been subjected to inter prediction and thus a reference pixel is a pixel having been subjected to inter prediction, reference pixels included in the block having been subjected to inter prediction may be replaced with reference pixel information on a block having been subjected to intra prediction. That is, when a reference pixel is unavailable, information on the unavailable reference pixel may be replaced with at least one reference pixel of available reference pixels.

In intra prediction, when a PU and a TU have the same size, intra prediction for the PU may be performed based on left pixels, an upper-left pixel and upper pixels of the PU. On the other hand, when a PU and a TU have different sizes, intra prediction may be performed using reference pixels based on the TU. Further, intra prediction using N×N partitioning may be used only for a minimum CU.

In intra prediction, an adaptive intra smoothing (AIS) filter may be applied to reference pixels according to the prediction mode to generate a predicted block. Different kinds of AIS filters may be applied to the reference pixels. In intra prediction, filtering may be further performed using an additional filter on some rows in the PU after performing intra prediction using the reference pixels. Different types of filtering may be used for filtering the rows in the PU depending on directivity of a prediction mode.

The inter prediction module 106 may generate a PU on the basis of information on at least one picture among previous and subsequent pictures of the current picture. The inter prediction module 106 may include a reference picture interpolation module, a motion prediction module, and a motion compensation module.

The reference picture interpolation module may be supplied with reference picture information from the memory 150 and generate pixel information on a pixel smaller than an integer pixel from a reference picture. In the case of luma pixels, a discrete cosine transform DCT-based 8-tap interpolation filter (DCT-based Interpolation Filter) having a varying filter coefficient may be used to generate information on a pixel smaller than an integer pixel by ¼ pixel unit. In the case of chroma pixels, a DCT-based 4-tap interpolation filter (DCT-based Interpolation Filter) having a varying filter coefficient may be used to generate information on a pixel smaller than an integer pixel by ⅛ pixel unit.

The inter prediction module 106 may perform motion prediction on the basis of the reference picture interpolated by the reference picture interpolation module. Various methods, such as a full search-based block matching algorithm (FBMA), a three-step search (TSS) algorithm and a new three-step search (NTS) algorithm, may be used to derive a motion vector. The motion vector has a motion vector value by a ½ or ¼ pixel unit on the basis of an interpolated pixel. The inter prediction module 106 may predict a current PU using different motion prediction methods. Various methods, such as skipping, merging, and advanced motion vector prediction (AMVP), may be used as a motion prediction method.

A residual block including residual information which is a difference between the predicted PU and the original block of the PU may be generated based on the PU generated by the prediction module 110. The generated residual block may be input to the transform module 115. The transform module 115 may transform the residual block including the residual information as the difference between the PU and the original block using a transform method such as Discrete Cosign Transform (DCT) or Discrete Sine Transform (DST). A transform method to may be determined among DCT and DST on the basis of intra prediction mode information and size information on the PU used to generate the residual block. The transform module may use different transform methods depending on PU sizes.

The quantization module 120 may quantize values transformed to a frequency domain by the transform module 115. A quantization parameter may change depending on a block or importance of a picture. Values output from the quantization module 120 may be provided to the dequantization module 135 and the rearrangement module 125.

The rearrangement module 125 may rearrange coefficients with respect to a quantized residual value. The rearrangement module 125 may change a two-dimensional (2D) block of coefficients into a one-dimensional (1D) vector of coefficients through coefficient scanning. For example, the rearrangement module 125 may change a 2D block of coefficients into a 1D vector of coefficients by scanning from DC coefficients to coefficients of a high frequency domain using zigzag scanning (zig-zag scan). Alternatively, vertical scanning of scanning a 2D block of coefficients in a vertical direction and horizontal scanning of scanning a 2D block of coefficients in a horizontal direction may be used depending on a TU size and an intra prediction mode, instead of zigzag scanning That is, a scanning method for use may be selected among zigzag scanning, vertical scanning, and horizontal scanning based on a TU size and an intra prediction mode.

The entropy encoding module 130 may perform entropy encoding on the basis of the values obtained by the rearrangement module 125. Various encoding methods, such as exponential Golomb coding, context-adaptive variable length coding (CAVLC), and context-adaptive binary arithmetic coding (CABAC), may be used for entropy encoding.

The entropy encoding module 130 may entropy-encode diverse types of information, such as residual coefficient information and block type information on a CU, prediction mode information, partitioning unit information, PU information, transfer unit information, motion vector information, reference frame information, block interpolation information and filtering information, provided from the rearrangement module 120 and the prediction module 110 according to a predetermined encoding method. Further, the entropy encoding module 130 may entropy-encode coefficients of a CU input from the rearrangement module 125.

The entropy encoding module 130 may store a table for entropy encoding, such as a variable-length code (VLC) table, and perform entropy encoding using the VLC table. In entropy encoding, allocation of some codewords included in the table to code numbers of corresponding information may be changed by a counter method or direct swapping. For instance, in a case of a plurality of higher code numbers allocated short-bit codewords in a table mapping code numbers to codewords, a mapping order of the codewords and the code numbers in the table may be adaptively changed so that a short-length codeword is allocated to a code number determined by a counter to most frequently happen in total. When a number of counting times by the counter is equal to a preset threshold, the number of counting times recorded in the counter may be divided in half, followed by counting again.

When information corresponding to the code number happens, a code number in the table which is not counted is switched with a code number immediately above by direct swapping, to reduce a bit number allocated to the code number, thereby being entropy-encoded.

The dequantization module 135 and the inverse transform module 140 dequantize the values quantized by the quantization module 120 and inversely transform the values transformed by the transform module 115. A residual value generated by the dequantization module 135 and the inverse transform module 140 may be merged with a PU, which is predicted through the motion vector prediction module, the motion compensation module and the intra prediction module of the prediction module 110, thereby generating a reconstructed block.

The filter module 145 may include at least one of a deblocking filter, an offset correction module, and an adaptive loop filter (ALF).

The deblocking filter may remove block distortion generated on boundaries between blocks in a reconstructed picture. Whether to apply the deblocking filter to a current block may be determined on the basis of pixels included in several rows or columns of the block. When the deblocking filter is applied to a block, a strong filter or a weak filter may be applied depending on a required deblocking filtering strength. When horizontal filtering and vertical filtering may be employed in applying the deblocking filter, horizontal filtering and vertical filtering may be performed in parallel.

The offset correction module may correct an offset of the deblocked picture from the original picture by a pixel. To perform offset correction on a specific picture, a method of partitioning pixels of the picture into a predetermined number of regions, determining a region to be subjected to offset correction, and applying an offset to the determined region or applying an offset in consideration of edge information on each pixel may be used.

The Adaptive Loop Filter (ALF) may perform filtering based on a result of comparing the filtered reconstructed picture and the original picture. Pixels included in the picture may be partitioned into one or more groups, a filter to be applied to each group may be determined, and differential filtering may be performed for each group. Information on whether to apply the ALF with respect to luma signal may be transferred by each coding unit (CU) and a size and coefficient of an ALF to be applied to each block may vary. The ALF may have various types and a number of coefficients included in a corresponding filter may vary. Filtering information on the ALF, such as filter coefficient information, ALF ON/OFF information, and filter type information, may be included and transferred in a parameter set of a bitstream.

The memory 150 may store a reconstructed block or picture output from the filter module 145, and the stored reconstructed block or picture may be supplied to the prediction module 110 when performing inter prediction.

Figure 2:
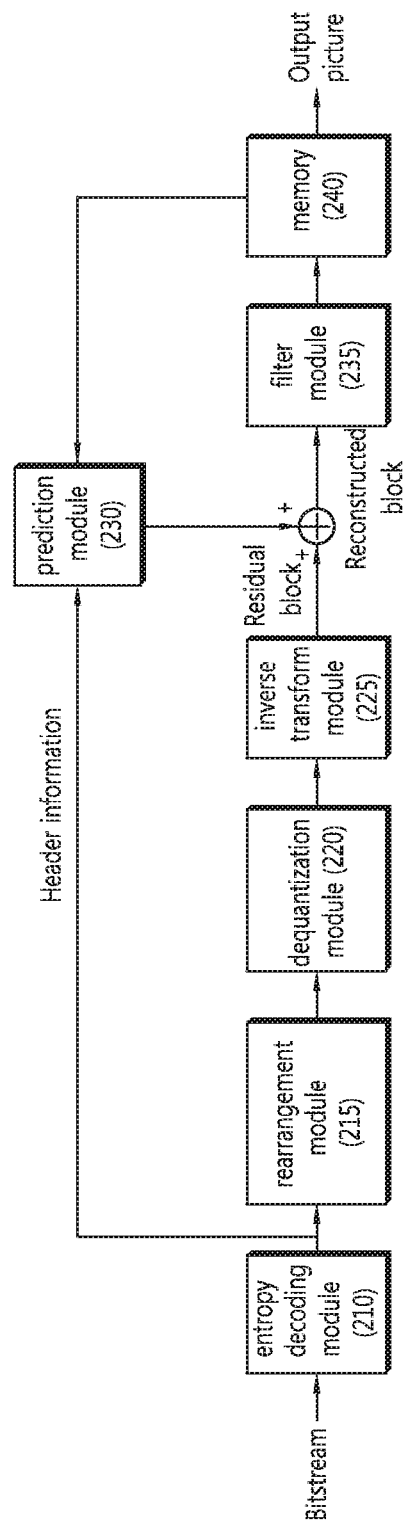
FIG. 2 is a block diagram illustrating a decoding apparatus according to an exemplary embodiment of the present invention.

FIG. 2 is a block diagram illustrating a decoding apparatus according to an exemplary embodiment of the present invention.

Referring to FIG. 2, the decoding apparatus may include an entropy decoding module 210, a rearrangement module 215, an dequantization module 220, an inverse transform module 225, a prediction module 230, a filter module 235, and a memory 240.

When a bitstream is input from the encoding apparatus, the input bitstream may be decoded according to the process of the encoding apparatus in reverse.

The entropy decoding module 210 may perform entropy decoding according to a reverse process of the entropy encoding process by the entropy encoding module of the encoding apparatus. For example, the same VLC table as used for entropy encoding in the encoding apparatus may be also used for the entropy decoding module to perform entropy decoding. Among decoded information by the entropy decoding module 210, information for generating a prediction block may be provided to the prediction module 230, and a residual value entropy-decoded by the entropy decoding module may be input to the rearrangement module 215.

The entropy decoding module 210 may also change a codeword allocation table using the counter method or direct swapping, like the entropy encoding module, and perform entropy decoding based on the changed codeword allocation table.

The entropy decoding module 210 may decode information about intra prediction and inter prediction performed in the encoding apparatus. As described above, when the encoding apparatus has a constraint in performing intra prediction and inter prediction, for example, when a neighboring prediction mode is unavailable, the entropy decoding module may perform entropy decoding in view of such a constraint to obtain information about intra prediction and inter prediction of a current block.

The rearrangement module 215 may rearrange the bitstream entropy-decoded by the entropy decoding module 210 on the basis of the rearrangement method of the encoding module. The rearrangement module 215 may reconstruct and rearrange a 1D vector of coefficients into a 2D block of coefficients. The rearrangement module 215 may be supplied with information about coefficient scanning performed by the encoding module and perform rearrangement in reverse scanning order to that of the encoding module.

The dequantization module 220 may perform dequantization on the basis of a quantization parameter supplied from the encoding apparatus and the rearranged coefficients of the block.

The inverse transform module 225 may perform inverse DCT and inverse DST on a result of quantization performed by the encoding apparatus in response to DCT and DST performed by the transform module of the encoding apparatus. Inverse transform may be performed on the basis of a transfer unit determined by the encoding apparatus. The transform module of the encoding apparatus may selectively perform DCT and DST depending on a plurality of information elements, such as a prediction method, a size of a current block and a prediction direction, and the inverse transform module 225 of the decoding apparatus may perform inverse transform on the basis of information on transform performed by the transform module of the encoding apparatus.

Transform may be performed based on a CU, instead of a TU.

The prediction module 230 may generate a prediction block based on information on generation of the prediction block provided from the entropy decoding module 210 and information on a previously decoded block or picture provided by the memory 240.

Similarly to the operation of the encoding apparatus as described above, when a PU and a TU have the same size in performing intra prediction, intra prediction for the PU may be performed based on left pixels, an upper-left pixel and upper pixels of the PU. On the other hand, when a PU and a TU have different sizes in performing intra prediction, intra prediction may be performed using reference pixels based on the TU. Further, intra prediction using N×N partitioning may be used only for a minimum CU.

The prediction module 230 may include a PU determination module, an inter prediction module and an intra prediction module. The PU determination module may receive a variety of information, such as PU information input from the entropy decoding module, prediction mode information on an intra prediction method and motion prediction-related information on an inter prediction method, may distinguish a PU in a current CU, and may determine which of the inter prediction and the intra prediction is performed on the PU. The inter prediction module may perform inter prediction on a current PU on the basis of information included in at least one picture among previous and subsequent pictures of a current picture including the current PU, using information necessary for inter prediction for the current PU supplied from the video encoding apparatus.

In order to perform inter prediction, it may be determined based on the CU whether a motion prediction method for the PU included in the CU is a skip mode, a merge mode or an AMVP mode.

The intra prediction module may generate a prediction block on the basis of information on a pixel in a current picture. When a PU is a PU subjected to intra prediction, intra prediction may be performed based on intra prediction mode information on the PU supplied from the video encoding apparatus. The intra prediction module may include an MS filter, a reference pixel interpolation module, and a DC filter. The MS filter performs filtering on reference pixels of a current block, and whether to apply the MS filter may be determined depending on a prediction mode for the current PU. AIS filtering may be performed on the reference pixels of the current block using the prediction mode for the PU and information on the MS filter supplied from the video encoding apparatus. When the prediction mode of the current block does not perform MS filtering, the MS filter may not be applied. Also, as in the encoding apparatus, after the prediction block is generated, the prediction block may be additionally filtered along with the reference pixels.

When the prediction mode of the PU is a prediction mode of performing intra prediction on the basis of pixel values obtained by interpolating the reference pixels, the reference pixel interpolation module may generate reference pixels in a pixel unit smaller than an integer pixel unit by interpolating the reference pixels. When the prediction mode of the current PU is a prediction mode of generating a prediction block without interpolating the reference pixels, the reference pixels may not be interpolated. The DC filter may generate a prediction block through filtering when the prediction mode of the current block is the DC mode.

The reconstructed block or picture may be provided to the filter module 235. The filter module 235 includes a deblocking filter, an offset correction module, and an ALF.

The deblocking filter may be provided from the encoding apparatus with information on whether the deblocking filter is applied to the block or picture, and information on which of a strong filter and a weak filter is applied if the deblocking filter is used. The deblocking filter of the decoding apparatus may be provided with information on the deblocking filter from the encoding apparatus and may perform deblocking filtering on the block in the decoding apparatus. As in the encoding apparatus, vertical deblocking filtering and horizontal deblocking filter are performed first, in which at least one of vertical deblocking filtering and horizontal deblocking filtering may be performed on an overlapping region. Either of vertical deblocking filtering and horizontal deblocking filtering which is not previously performed may be performed on a region in which vertical deblocking filtering and horizontal deblocking filtering overlap. This deblocking filtering process may enable parallel processing of deblocking filtering.

The offset correction module may perform offset correction on the reconstructed picture on the basis of an offset correction type and offset value information applied to the picture in encoding.

The ALF may perform filtering based on a result of comparing the filtered reconstructed picture and the original picture. The ALF may be applied to a CU on the basis of information on whether the ALF is applied and ALF coefficient information provided from the encoding apparatus. The ALF information may be included and provided in a specific parameter set.

The memory 240 may store the reconstructed picture or block to be used as a reference picture or a reference block and may provide the reconstructed picture to an output module.

Although a term "coding unit (CU)" is used to refer to a unit of encoding for convenience in the following embodiments of the invention as described above, it may also represent a unit of decoding. Hereinafter, methods of encoding/decoding an intra prediction mode using two candidate intra prediction modes to be illustrated in FIGS. 3 to 8 according to exemplary embodiments of the present invention may be realized in accordance with functions of the modules of the encoding apparatus and the decoding apparatus described above in FIGS. 1 and 2, which fall within the scope of the present invention.

Hereinafter, syntax elements used in exemplary embodiments of the present invention and definitions of the syntax elements will be illustrated. The syntax elements and the definitions thereof are provided only for illustrative purposes, and other syntax elements and definitions thereof may be used to express equivalent meanings in different manners without departing from the nature of the present invention.

In the following embodiments, a sequence header may be used to refer to header information for decoding a sequence, which includes a sequence parameter set (SPS), and a picture header may be used to refer to header information for decoding a picture, which includes a picture parameter set (PPS).

cu_qp_delta_enable_flag is a syntax element determining whether to change a quantization parameter in a CU layer. In the following embodiments, cu_qp_delta_enable_flag may be termed "CU quantization parameter change enabling information."

pic_init_qp_minus26 is a syntax element which is included in a PPS and includes basic quantization parameter value information of a slice referring to the PPS. A quantization parameter value of each slice, that is, an initial quantization parameter value of a current slice, may be derived by obtaining a basic quantization parameter value from the syntax element pic_init_qp_minus26 and adding a changed slice quantization parameter value to the basic quantization parameter value or subtracting the changed slice quantization parameter value from the basic quantization parameter value by additionally using a quantization parameter difference of each slice slice_qp_delta. In a CU, a quantization parameter value may be changed for each CU using a syntax element cu_qp_delta, which will be described. In the following embodiments, pic_init_qp_minus26 may be termed "basic quantization parameter information."

max_cu_qp_delta_depth is a syntax element specifying a depth of a maximum CU that allows change of a quantization parameter value, and Log 2MaxCUSize is a syntax element specifying a size of the maximum CU. A variable log 2MinCUDQPSize specifies a size of a minimum CU that is derived by Equation 1 based on max_cu_qp_delta_depth and Log 2MaxCUSize values and allows change of a quantization parameter value.

In the following embodiments, max_cu_qp_delta_depth may be termed "maximum quantization parameter changeable depth information."

$$\text{log 2MinCUDQPSize=Log 2MaxCUSize}-\text{max\_cu\_qp\_delta\_depth} \quad \text{<Equation 1>}$$

slice_qp_delta may be used to set up a quantization parameter value of each slice. An initial quantization parameter value (SliceQPY) of a slice is set up by Equation 2. pic_init_qp_minus26 is a basic quantization parameter value of a slice as described above, and slice_qp_delta may be defined as a variation in quantization parameter value of each slice for deriving an initial quantization parameter value of the slice. An initial quantization parameter value of a slice may be a quantization parameter value that the slice first has. In the following embodiments, slice_qp_delta may be termed "changed slice quantization parameter information."

$$\text{SliceQP}_Y=26+\text{pic\_init\_qp\_minus26}+\text{slice\_qp\_delta} \quad \text{<Equation 2>}$$

A syntax element cu_qp_delta may change a quantization parameter value of a quantization group. A quantization group may be a unit having the same quantization parameter value. When a CU split flag (split_coding_unit_flag) of a current CU is 0 and a size of the CU (log 2CUSize) is the same as or larger than the size of the minimum CU (log 2MinCUDQSize) which allows change of the quantization parameter value, a quantization group includes the current CU only. Meanwhile, when the CU split flag (split_coding_unit_flag) of the current CU is 1 and the size of the CU (log 2CUSize) is the same as the size of the minimum CU (log 2MinCUDQSize) which allows change of the quantization parameter value, a quantization group includes all CUs partitioned from the current CU.

A quantization parameter QPY of a current CU may be derived based on a previous quantization parameter QPY, PREV and cu_qp_delta. For instance, the quantization parameter of the current CU may be derived by Equation 3.

$$QP_Y=(((QP_{Y,PREV}+\text{cu\_qp\_delta}+52+2*QpBdOffset_Y) \%(52+QpBdOffset_Y))-QpBdOffset_Y \quad \text{<Equation 3>}$$

The previous quantization parameter QPY, PREV is a variable used to derive the quantization parameter value of the current CU, which may be derived from a left neighboring quantization group of the current CU in a current slice. If the left neighboring quantization group is unavailable, the previous quantization parameter may be a quantization parameter of a group decoded right before. A previous quantization parameter QPY, PREV of a first quantization group in each slice may be an initial quantization parameter value of the slice.

Bit depth offset information QpBdOffsetY for deriving a quantization parameter may be derived from a syntax element bit_depth_luma_minus8 included in a sequence header. Bit depth offset information for a quantization parameter may be set by Equation 4.

$$QpBdOffset_Y=6*\text{bit\_depth\_luma\_minus8} \quad \text{<Equation 4>}$$

In the embodiments, a term "CU" used to represent a change of quantization parameter value in a CU layer may refer to a CU included in one quantization group sharing one quantization parameter value for convenience. Hereinafter, a term "changed CU quantization parameter information" may be also used to express the same meaning.

Table 1 illustrates a method of setting up a quantization parameter value according to an exemplary embodiment of the present invention.

TABLE 1

Sequence Header
    cu_qp_delta_enabled_flag
Picture Header
    pic_init_qp_minus26
    If(cu_qp_delta_enabled_flag)
        max_cu_qp_delta_depth
Slice Header
    slice_qp_delta
Transform(CU layer)
    If(cu_qp_delta_enabled_flag)
        cu_qp_delta A sequence header may include information on whether to additionally change a quantization parameter in a CU layer through CU quantization parameter change enabling information (cu_qp_delta_enabled_flag) as a syntax element.

A picture header may includes a basic quantization parameter (pic_init_qp_minus26) value as a syntax element which is used to derive initial quantization parameter value information on a slice referring to the picture header.

When it is determined based on the syntax element cu_qp_delta_enabled_flag included in the sequence header whether to change a quantization parameter in a CU layer, the picture header may include information on a depth of a maximum CU that allows change of a quantization parameter value through maximum quantization parameter changeable depth information (max_cu_qp_delta_depth) as a syntax element.

A slice header may include a changed slice quantization parameter (slice_qp_delta) value to derive a basic quantization parameter value based on the syntax element pic_init_qp_minus26 transmitted through the picture header and to derive initial quantization parameter value information applied to a current slice by further using slice_qp_delta. A quantization parameter value for each slice is referred to as a basic quantization parameter value.

When a quantization parameter value is changed in a CU layer, a quantization parameter value of a current CU may be changed based on a changed CU quantization parameter (cu_qp_delta) value.

In the present embodiment, a quantization parameter value used to quantize a current slice ranges 0 to 51, without being limited thereto.

In a quantization method according to the present embodiment, a method of encoding information on a quantization parameter range available for a current slice may be used to encode quantization parameter information on a CU included in the current slice.

The information on the quantization parameter range available for the CU included in the slice may be defined as a syntax element qp_range and be included in the picture header or slice header. The syntax element qp_range may be expressed as an independent syntax element or in combination with another syntax element. In the following embodiments, the syntax element qp_range may be expressed as an independent syntax element for convenience.

A basic quantization parameter value to be used for the slice referring to the picture header may be transmitted based on a value of the syntax element pic_init_qp_minus26 included in a corresponding picture. A qp_range value included in the picture header is a value to be subtracted from or added to the initial quantization parameter value of the slice derived by Equation 2 in a slice unit and may define a range of a quantization parameter value that the CU included in the slice has.

That is, as represented by Equation 5, a quantization parameter limit range for the CU included in the slice referring to the picture header may be set to be from a value obtained by subtracting the qp_range value as quantization parameter range information from the initial quantization parameter of the slice to a value obtained by adding the qp_range value to the initial quantization parameter of the slice.

$$SliceQP_y - qp\_range \leq \text{Quantization parameter of } CU \leq SliceQP_y + qp\_range \quad \text{<Equation 5>}$$

As described above, the initial quantization parameter value of the slice may be a previous quantization parameter value of a first CU of the slice in decoding order.

A quantization parameter value of a current CU may be derived by subtracting a changed CU quantization parameter value (cu_qp_delta) of the current CU from a previous quantization parameter value or adding the changed CU quantization parameter value to the previous quantization parameter value.

In a quantization parameter decoding method according to one exemplary embodiment of the present invention, when a quantization parameter value range of a CU included in a slice is limited by quantization parameter range information, a VLC table used for encoding/decoding a cu_qp_delta value may be changed.

For example, when the initial quantization parameter value of the slice is 26 and qp_range is 3, the CU included in the slice may have a quantization parameter value ranging from 23 to 29. In this case, if a previous quantization parameter QPY, PREV is 29 and a quantization parameter of the current CU is 27, the current CU has a cu_qp_delta value of −2. A previous quantization parameter of 29 means that since the current CU included in the slice may have a quantization parameter ranging from 23 to 29, the cu_qp_delta value of the current CU does not have a positive value. When cu_qp_delta does not have a positive value, a table for encoding a negative range of cu_qp_delta values only without encoding a positive range of cu_qp_delta values may be used to perform entropy encoding on cu_qp_delta.

That is, a VLC table such as Table 2 may be used to perform entropy encoding.

TABLE 2

| codeNum | delta_Qp value | current Qp value | bit string |
|---------|----------------|------------------|------------|
| 0 | 0 | 29 | 1 |
| — | 1 | 30 | — |
| 1 | −1 | 28 | 010 |
| — | 2 | 31 | — |
| 2 | −2 | 27 | 011 |
| — | 3 | 32 | — |
| 3 | −3 | 26 | 00100 |
| — | 4 | 33 | — |
| 4 | −4 | 25 | 00101 |
| — | 5 | 34 | — |
| 5 | −5 | 24 | 00110 |
| — | 6 | 35 | — |
| 6 | −6 | 23 | 00111 |

A binary encoding method used in the VLC table of the present embodiment is provided for illustrative purposes only, and different binary codes may be used for other binary encoding methods.

As described above, a method of generating a VLC table using a previous quantization parameter and a quantization parameter limit range of a CU may be performed in the same manner for an operation of the decoding apparatus dequantizing a CU.

Entropy encoding that does not allocate a codeword to an unnecessary cu_cp_delta value may reduce unnecessary waste of codewords, resulting in enhancement of encoding/decoding efficiency.

VLC tables for entropy encoding may be stored in the encoding apparatus or decoding apparatus, among which a VLC table may be selectively used for encoding a changed CU quantization parameter of a current CU in view of a previous quantization parameter value and a quantization parameter range of the CU. Alternatively, a VLC table is generated whenever a changed CU quantization parameter is encoded or decoded, instead of using a previously stored VLC table, thereby performing entropy encoding or entropy decoding. Although the present embodiment illustrates that quantization parameter range information (qp_range) is transmitted via a picture header, the quantization parameter range information (qp_range) may be transmitted via a slice header as described above. In this case, a different quantization parameter range may be set for each slice.

Figure 3:
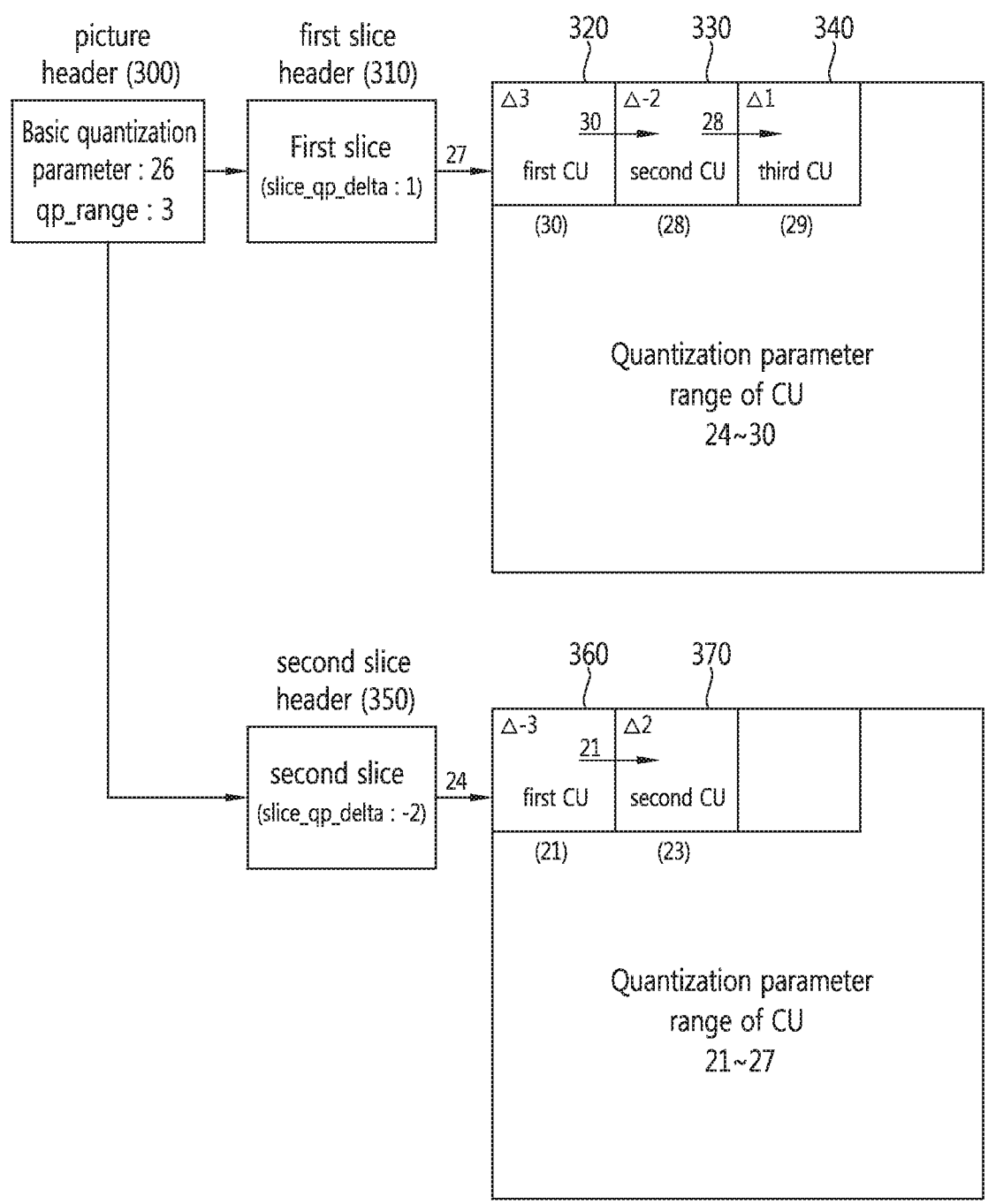
FIG. 3 is a diagram illustrating a method of decoding a quantization parameter of a coding unit according to an exemplary embodiment of the present invention.

FIG. 3 is a diagram illustrating a method of decoding a quantization parameter of a CU according to an exemplary embodiment of the present invention.

FIG. 3 shows a method of decoding a quantization parameter value of a CU included in a slice when a basic quantization parameter is set to 26 and a quantization parameter range is set to 3 in a picture header.

The picture header 300 may include basic quantization parameter information (pic_init_qp_minus26) and quantization parameter range information (qp_range).

A basic quantization parameter value of the slice to be decoded may be obtained as 26 based on the basic quantization parameter information (pic_init_qp_minus26) in the picture header 300, and an initial quantization parameter value of a first slice which is 27 may be derived by adding a changed slice quantization parameter information (slice_qp_delta) of 1, derived by decoding a first slice header 310, to the basic quantization parameter value.

A quantization parameter limit range allowed for a CU included in the first slice may be from 24 to 30, obtained by adjusting the initial quantization parameter value of the first slice of 27 additively or subtractively by a quantization parameter range information (qp_range) of 3.

As the initial quantization parameter value of the first slice of 27 is a previous quantization parameter of a first CU 320 of the first slice, a VLC table as illustrated in Table 3 for decoding a changed CU quantization parameter (cu_qp_delta) may be used to decode a quantization parameter of the first CU 320.

TABLE 3

| codeNum | delta_Qp value | current Qp value | bit string |
|---------|----------------|------------------|------------|
| 0 | 0 | 27 | 1 |
| 1 | 1 | 28 | 010 |
| 2 | −1 | 26 | 011 |
| 3 | 2 | 29 | 00100 |
| 4 | −2 | 25 | 00101 |
| 5 | 3 | 30 | 00110 |
| 6 | −3 | 24 | 00111 |

Referring to Table 3, since the previous quantization parameter value is 27, the VLC table may have cu_qp_delta values ranging from 3 to −3 so as to represent a quantization parameter limit range of 24 to 30.

When the first CU 320 decoded first has a quantization parameter of 30, a code number of 5 may be derived and a cu_qp_delta value of 3 corresponding to the code number of 5 may be derived by decoding based on the VLC table of Table 3.

When a second CU 330 decoded subsequently to the first CU 320 has a quantization parameter of 28, the quantization parameter value of the first CU of 30 may be used as a previous quantization parameter value of the second CU 330. When the previous quantization parameter value is 30, the CU included in the first slice may have a quantization parameter limit range of 24 to 30, and thus the cu_qp_delta value may not have a positive value. Thus, a VLC table as illustrated in Table 4 may be used to decode a cu_qp_delta value of the second CU.

TABLE 4

| codeNum | delta_Qp value | current Qp value | bit string |
|---------|----------------|------------------|------------|
| 0 | 0 | 30 | 1 |
| — | 1 | — | — |
| 1 | −1 | 29 | 010 |
| — | 2 | — | — |
| 2 | −2 | 28 | 011 |
| — | 3 | — | — |
| 3 | −3 | 27 | 00100 |
| — | 4 | — | — |
| 4 | −4 | 26 | 00101 |
| — | 5 | — | — |
| 5 | −5 | 25 | 00110 |
| — | 6 | — | — |
| 6 | −6 | 24 | 00111 | referring to Table 4, there are code numbers and binary codes for representing cu_qp_delta in a negative range only without any code number and any binary code for cu_qp_delta in a positive range. When this new VLC table is used, a binary code representing unnecessary cu_qp_delta is not used, thereby reducing a bit number of a binary code for representing cu_qp_delta of the current CU.

The second CU is decoded using the VLC table of Table 4, thereby decoding a code number of 2 and decoding a cu_qp_delta value of −2 corresponding to the code number of 2.

When a third CU 340 decoded subsequently to the second CU 330 has a quantization parameter of 29, the quantization parameter value of the second CU 330 of 28 may be used as a previous quantization parameter value of the third CU 340. As in decoding the cu_qp_delta value of the second CU 330, a new VLC table may be used to decode a cu_qp_delta value of the third CU 340. Since the CU included in the first slice may have a quantization parameter limit range of 24 to 30, when the quantization parameter value of the second CU 330 is 28, the third CU may not have a cu_qp_delta value more than 3. That is, the VLC table may not use code numbers and binary codes for representing cu_qp_delta values of 3 or greater.

Table 5 is a VLC table for the third CU 340.

TABLE 5

| codeNum | delta_Qp value | current Qp value | bit string |
|---------|----------------|------------------|------------|
| 0 | 0 | 28 | 1 |
| 1 | 1 | 29 | 010 |
| 2 | −1 | 27 | 011 |
| 3 | 2 | 30 | 00100 |
| 4 | −2 | 26 | 00101 |
| — | 3 | — | — |
| 5 | −3 | 25 | 00110 |
| — | 4 | — | — |
| 6 | −4 | 24 | 00111 |

As in Table 4, Table 5 does not include an unnecessary range of cu_qp_delta, and thus unnecessary code numbers and unnecessary binary codes may not be generated in the VLC table.

The quantization parameter of the third CU 340 may be decoded using Table 5.

A quantization parameter of a CU included in a second slice may be decoded in the same manner as used for the first slice.

When the basic quantization parameter value decoded from the picture header is 26 and a slice_qp_delta value decoded from a second slice header 350 is −2, an initial quantization parameter value of the second slice may be derived as 24. A quantization parameter limit range allowed for a CU included in the second slice may be from 21 to 27 based on the initial quantization parameter value of the second slice of 24 and a value of 3 derived by decoding the qp_range value as the quantization parameter range information from the picture header.

The initial quantization parameter value of the second slice of 24 may be a previous quantization parameter of a first CU 360. Since the quantization parameter limit range of the CU included in the second slice is from 21 to 27, a VLC table having cu_qp_delta values ranging from −3 to 3 as illustrated in Table 6 may be used to decode a cu_qp_delta value of the first CU.

TABLE 6

| codeNum | delta_Qp value | current Qp value | bit string |
|---------|----------------|------------------|------------|
| 0 | 0 | 24 | 1 |
| 1 | 1 | 25 | 010 |
| 2 | −1 | 23 | 011 |
| 3 | 2 | 26 | 00100 |
| 4 | −2 | 22 | 00101 |
| 5 | 3 | 27 | 00110 |
| 6 | −3 | 21 | 00111 |

Using the VLC table of Table 6, the cu_qp_delta value of the first CU of −3 is decoded and a quantization parameter value of the first CU 360 of 21 may be decoded.

A second CU 370 decoded subsequently to the first CU 360 may use the quantization parameter value of the first CU 360 of 21 as a previous quantization parameter value of the second CU 370. As described above, since the CU included in the second slice may have a quantization parameter limit range of 21 to 27, when the quantization parameter value of the first CU 360 used as the previous quantization parameter of the second CU 370 is 21, the second CU may not have a negative cu_qp_delta value. Thus, a VLC table including no code number and no binary code for representing a negative range of cu_qp_delta values as illustrated in Table 7 may be used to decode the cu_qp_delta value of the second CU.

TABLE 7

| codeNum | delta_Qp value | current Qp value | bit string |
|---------|----------------|------------------|------------|
| 0 | 0 | 21 | 1 |
| 1 | 1 | 22 | 010 |
| — | −1 | — | — |
| 2 | 2 | 23 | 011 |
| — | −2 | — | — |
| 3 | 3 | 24 | 00100 |
| — | −3 | — | — |
| ... | | | |

Referring to Table 7, there are code numbers and binary codes for representing cu_qp_delta in a positive range only without any code number and any binary code for cu_qp_delta in a negative range. When this new VLC table is used, a binary code representing unnecessary cu_qp_delta is not used, thereby reducing a bit number of a binary code for representing cu_qp_delta of the current CU.

For convenience of description, FIG. 3 illustrates the method of decoding the quantization parameter value only. However, the same VLC table for encoding cu_qp_delta may be stored in both the encoding apparatus and the decoding apparatus or a VLC may be realized in the same manner in the encoding apparatus and the decoding apparatus, and thus the same quantization parameter value as used for encoding may be used to perform decoding.

Figure 4:
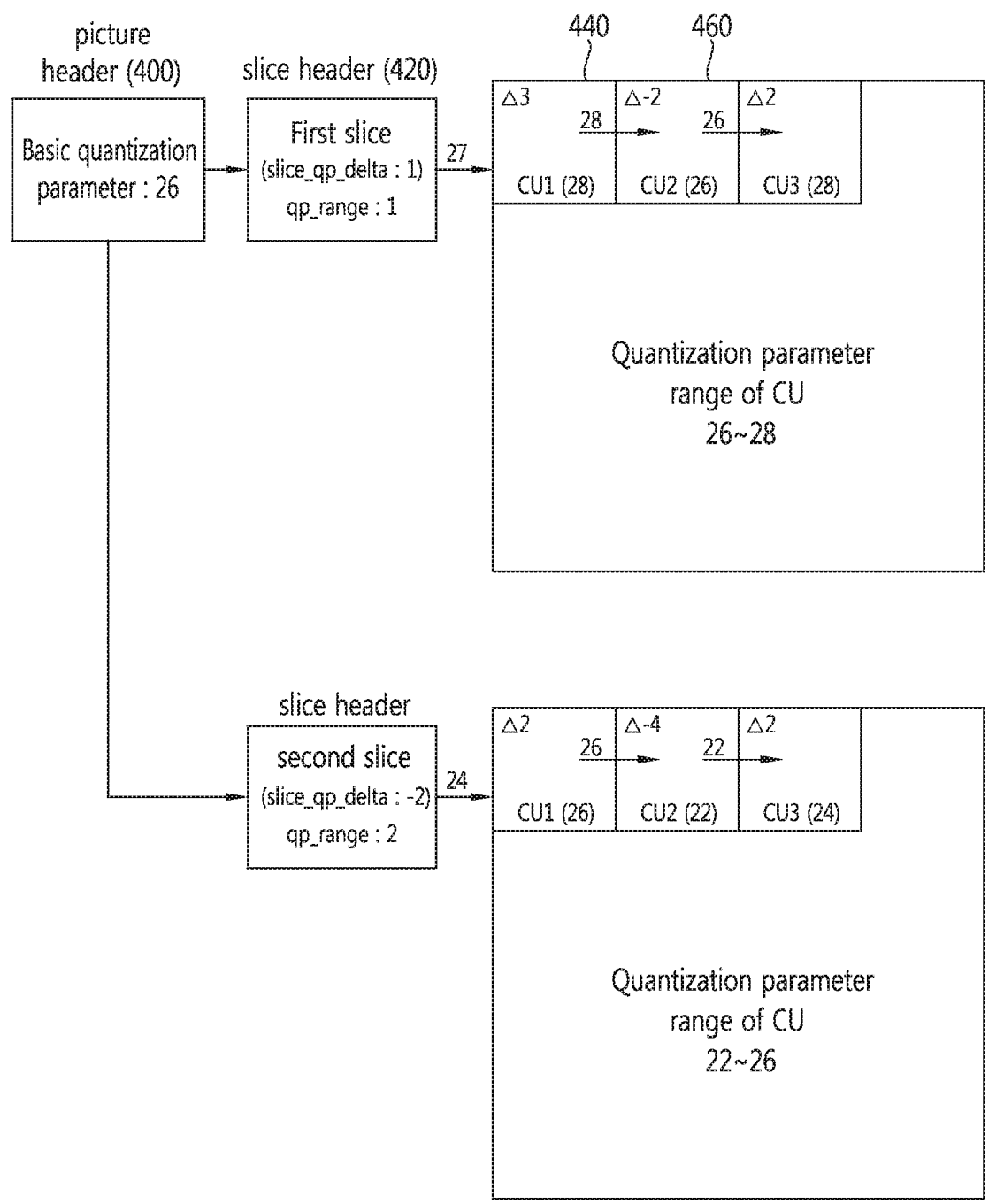
FIG. 4 is a diagram illustrating a method of deriving a quantization parameter of a coding unit according to an exemplary embodiment of the present invention.

FIG. 4 is a diagram illustrating a method of deriving a quantization parameter value of a CU according to an exemplary embodiment of the present invention.

FIG. 3 shows that quantization parameter range information (qp_range) as a syntax element is included in a picture header and a quantization parameter value limit range of a CU included in a slice is encoded and decoded, whereas FIG. 4 illustrates that quantization parameter range information (qp_range) as a syntax element is included in a slice header and a quantization parameter value limit range of a CU included in a slice is encoded and decoded.

A basic quantization parameter value of 26 is decoded from a picture header 400 and a slice_qp_delta value included in a slice header 420 is decoded, thereby deriving an initial quantization parameter value of a current slice. When the decoded slice_qp_delta value is 1, the initial quantization parameter value may be 27.

A qp_range value as quantization parameter range information is decoded from the slice header, thereby determining a quantization parameter limit range allowed for a CU included in the current slice. When the decoded qp_range value is 1, the quantization parameter limit range of the CU included in the slice is from 26 to 28.

The derived initial quantization parameter value may be used as a previous quantization parameter value of a first CU 440 decoded first in the slice, and a VLC table for decoding cu_qp_delta of the first CU 440 may be determined based on the previous quantization parameter value and a quantization parameter limit range of the first CU 440. When the previous quantization parameter value is 27 and the quantization parameter limit range of the CU included in the current slice is from 26 to 28, a VLC table having cu_qp_delta values ranging from −1 to 1 may be used for the first CU 440. Further, for decoding a quantization parameter of a second CU 460, a previous quantization parameter value used to decode the quantization parameter of the second CU 460 may be the quantization parameter value of the first CU 440 of 28 and the quantization parameter limit range of the CU included in the current slice is from 26 to 28, a VLC table having cu_qp_delta values ranging from −2 to 0 without cu_qp_delta values in a positive range may used to decode the second CU 460.

Whereas the method of decoding the quantization parameter of the CU illustrated in FIG. 3, FIG. 4 shows that the quantization parameter range information (qp_range value) is decoded from the slice header to determine the quantization parameter value of the CU included in the slice. That is, a quantization parameter limit range may be allocated to each slice.

In the quantization parameter encoding/decoding methods according to the embodiments of the present invention, exponential Golomb coding and a variety of binary coding methods may be used for binary coding of a VLC table for representing cu_qp_delta of a CU without departing from the scope of the present invention.

Tables 8 to 10 illustrate structures of syntax elements including quantization parameter information according to other exemplary embodiments of the present invention.

TABLE 8

Sequence Header
    cu_qp_delta_enabled_flag
Picture Header
    If(cu_qp_delta_enabled_flag)
        max_cu_qp_delta_depth
Slice Header
    slice_qp
Transform(CU layer)
    If(cu_qp_delta_enabled_flag)
        cu_qp_delta Referring to Table 8, a sequence header may include information on whether to change a quantization parameter in a CU layer through a syntax element cu_qp_delta_enable_flag.

A picture header may include depth information on a maximum CU that allows change of a quantization parameter value through a syntax element max_cu_qp_delta_depth if it is determined to change the quantization parameter in the CU layer.

A slice header may transmit an initial quantization parameter value used for a current slice through a slice_qp value. That is, the picture header may not include a basic quantization parameter value of the slice, but the slice header may include the initial quantization parameter value of the slice.

When it is determined to change the quantization parameter value in a CU, the CU layer may include a syntax element cu_qp_delta for changing a quantization parameter value of the current CU.

Table 9 illustrates a structure of a syntax element including quantization parameter information according to an exemplary embodiment of the present invention.

TABLE 9

Sequence Header
    cu_qp_delta_depth-ue(v)
      • 0 = no delta QP
      • 1 = LCU
      • 2 = (LCU/2)x(LCU/2)
      • 3 = (LCU/4)x(LCU/4), etc
Picture Header
    pic_init_qp_minus26
Slice Header
    slice_qp_delta
Transform(CU layer)
    If(cu_qp_delta_depth> 0)
      cu_qp_delta A sequence header may include a new syntax element cu_qp_delta_depth-ue(v), that is information on a depth of a CU layer where a quantization parameter is changed through. Here, ue(v) means that the syntax element is expressed by a binary system using variable-length unsigned exponential Golomb coding.

When cu_qp_delta_depth is 0, a quantization parameter may be changed only in a slice or picture unit including a CU, not in a CU layer. When cu_qp_delta_depth is 1, a quantization parameter may be changed only in a largest coding unit (LCU). When cu_qp_delta_depth is 2, a quantization parameter may be changed in a CU that is one of CUs into which an LCU is partitioned in half vertically and horizontally, that is, a CU with a depth level increased by one in a quadtree. When cu_qp_delta_depth is 3, a quantization parameter may be changed in a CU that is one of CUs into which an LCU is partitioned in quarter vertically and horizontally, that is, a CU with a depth level increased by two in a quadtree.

A picture header may include only basic quantization parameter information on a slice, pic_init_qp_minus26, except for max_cu_qp_delta_depth, since the sequence header determines a size of a CU with a varying quantization parameter value.

A slice header may include slice_qp_delta for deriving an initial quantization parameter value of a slice.

When cu_qp_delta_depth defined in the sequence header is greater than 0, that is, when a quantization parameter is changed in a CU layer, a CU may include cu_qp_delta for changing a quantization parameter value of the CU.

Table 10 illustrates a structure of a syntax element including quantization parameter information according to another exemplary embodiment of the present invention.

TABLE 10

Sequence Header
    cu_qp_delta_depth-ue(v)
      • 0 = no delta QP
      • 1 = LCU TABLE 10-continued

• 2 = (LCU/2)x(LCU/2)
      • 3 = (LCU/4)x(LCU/4), etc
Slice Header
    slice_qp
Transform(CU layer)
    If (cu_qp_delta_depth>0)
      cu_qp_delta Referring to Table 10, as in Table 9, a sequence header may include a new syntax element cu_qp_delta_depth-ue (v), that is, information on a depth of a CU layer where a quantization parameter is changed through. Here, ue(v) means that the syntax element is expressed by a binary system using variable-length unsigned exponential Golomb coding.

When cu_qp_delta_depth is 0, a quantization parameter may be changed only in a slice or picture unit including a CU, not in a CU layer. When cu_qp_delta_depth is 1, a quantization parameter may be changed only in a largest coding unit (LCU). When cu_qp_delta_depth is 2, a quantization parameter may be changed in a CU that is one of CUs into which an LCU is partitioned in half vertically and horizontally, that is, a CU with a depth level increased by one in a quadtree. When cu_qp_delta_depth is 3, a quantization parameter may be changed in a CU that is one of CUs into which an LCU is partitioned in quarter vertically and horizontally, that is, a CU with a depth level increased by two in a quadtree.

A slice header may directly include an initial quantization parameter value of a slice through slice_qp. Thus, a picture header may not include information on a quantization parameter.

When a quantization parameter value is changed in a CU based on cu_qp_delta_depth included in the sequence header, a CU layer may include cu_qp_delta for changing a quantization parameter value of the CU.

Tables 8 to 10 are provided to illustrate various embodiments of the present invention, in which the headers including the represented syntax elements are disposed at arbitrary locations but may be included in different locations without departing from the nature of the present invention.

As described above, even in the structures of the syntax elements in Tables 8 to 10, a quantization parameter range of a CU included in a picture or slice may be limited through a qp_range value encoded in at least one of a picture header and a slice header, and a quantization parameter value of the current CU may be represented using a VLC table considering a quantization parameter value of a previous CU and a quantization parameter limit range of the CU included in the slice.

Figure 5:
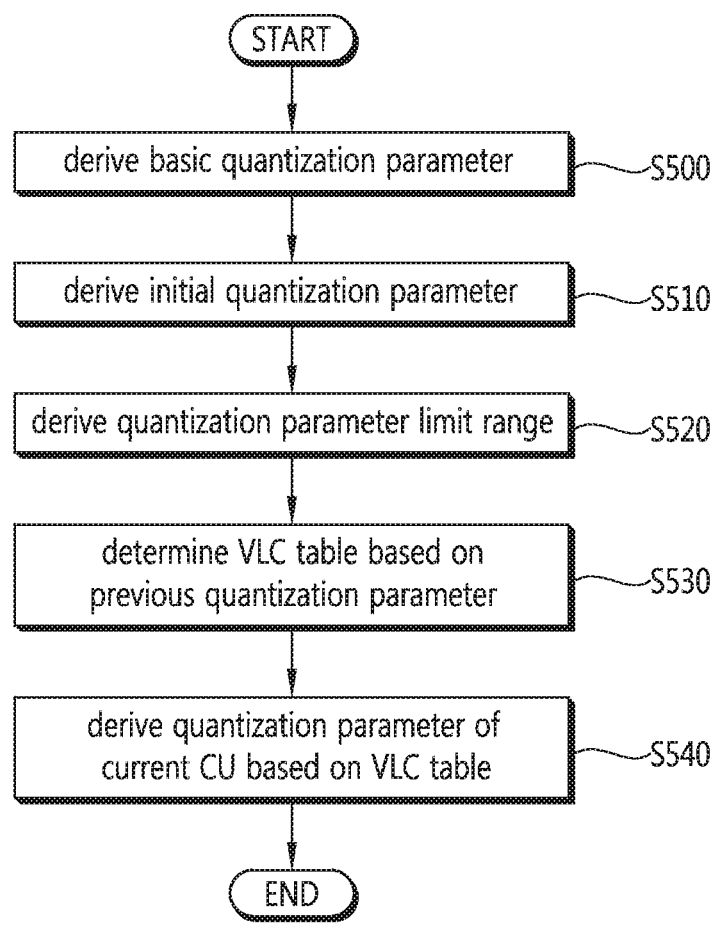
FIG. 5 is a flowchart illustrating a method of decoding a quantization parameter according to an exemplary embodiment of the present invention.

FIG. 5 is a flowchart illustrating a method of decoding a quantization parameter according to an exemplary embodiment of the present invention.

Referring to FIG. 5, a basic quantization parameter may be derived (S500).

The basic quantization parameter may be included in a picture header. For instance, a basic quantization parameter value of a slice referring to a current picture header may be derived based on a value of a syntax element, such as pic_init_qp_minus26, included in the picture header. If an initial quantization parameter value is derived directly from a slice as in Table 10, S550 may not be performed.

An initial quantization parameter may be derived (S510).

The initial quantization parameter may be derived by adding a slice_qp_delta value included in a slice header to the basic quantization parameter derived from the picture header. Alternatively, the initial quantization parameter of the slice may be derived by deriving a slice_qp value directly from the slice header.

A quantization parameter limit range may be derived (S520).

The quantization parameter limit range allowed for a CU included in the current slice may be derived based on the initial quantization parameter of the slice and a value of quantization parameter range information (qp_range) as a syntax element representing a quantization parameter range of the CU included in the slice transmitted via the picture header or the slice header.

A VLC table may be determined based on a previous quantization parameter (S530).

As described above, the previous quantization parameter may be used as a predictive value for deriving a quantization parameter of the current CU. The VLC table for deriving the quantization parameter of the current CU may be selected or created on the basis of a previous quantization parameter value of the CU and the quantization parameter limit range of the CU derived based on the qp_range value as the quantization parameter range information on the CU.

The quantization parameter of the current CU may be derived based on the determined VLC table (S540).

The quantization parameter of the current CU is derived based on the VLC table obtained in S530. As described above, using the VLC table, a code number may be obtained by decoding a binary code and a cu_qp_delta value corresponding to the code number may be derived.

The method of decoding the quantization parameter may further include determining whether to change the quantization parameter of the CU based on quantization parameter change enabling information or depth information on a CU where a quantization parameter is changed which are included in a sequence header.

Figure 6:
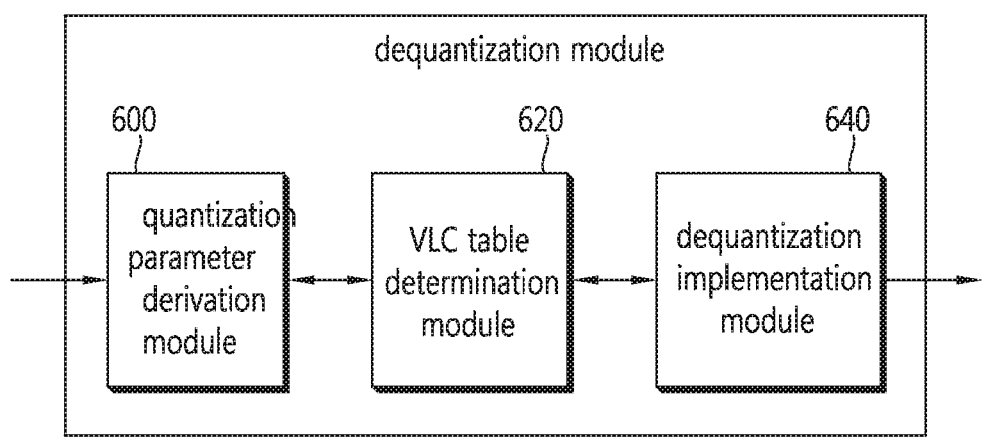
FIG. 6 is a diagram illustrating a dequantization module according to an exemplary embodiment of the present invention.

FIG. 6 is a diagram illustrating a dequantization module according to an exemplary embodiment of the present invention.

Referring to FIG. 6, the dequantization module may include a quantization parameter derivation module 600, a VLC table determination module 620, and a dequantization implementation module 640.

The quantization parameter derivation module 600 may derive a quantization parameter limit range of a CU included in a current slice based on quantization parameter variables provided from the entropy decoding module, such as basic quantization parameter information, initial quantization parameter information and quantization parameter range information. Further, the quantization parameter derivation module 600 may derive a previous quantization parameter value for decoding a quantization parameter of the current CU based on dequantization results of CUs decoded before the current CU.

Alternatively, the foregoing deriving operations may be performed by the entropy decoding module, instead of the quantization parameter derivation module 600 without departing from the scope of the present invention.

The VLC table determination module 620 may determine a VLC table for decoding the quantization parameter of the current CU based on the quantization parameter range of the CU and the previous quantization parameter value derived by the quantization parameter derivation module 600. A VLC table may be stored in advance in the VLC table determination module 620 or created by the VLC table determination module 620.

Alternatively, the foregoing determining operation may be performed by the entropy decoding module, instead of the VLC table determination module 620 without departing from the scope of the present invention.

The dequantization implementation module 640 may perform dequantization based on a quantization parameter value derived by the VLC table determination module 620.

Although the present invention has been described with reference to the exemplary embodiments, it will be appreciated by those skilled in the art that changes, modifications and alternatives may be made in these exemplary embodiments without departing from the principles and spirit of be the invention, the scope of which is defined in the appended claims and their equivalents.

The invention claimed is:

1. A computer-implemented method comprising:
   decoding an image by:
      determining an initial quantization value from a syntax element present in a picture parameter set of the image;
      applying the initial quantization value to a quantization parameter at the start of a first slice of coding units within the image;
      deriving a first scaled transform coefficient for a first coding unit within the first slice of coding units using the quantization parameter;
      decoding the first coding unit within the first slice of coding units using the first scaled transform coefficient; and
      modifying the quantization parameter from the initial quantization value at the start of the first slice of coding units for a subsequent slice of coding units, using a delta value stored in a header of the subsequent slice.

2. The computer-implemented method of claim 1, wherein decoding the image further comprises:
   modifying the quantization parameter as used to derive the first scaled transform coefficient for the first coding unit within the first slice of coding units for a second coding unit within the first slice of coding units using a delta value stored in association with the second coding unit;
   deriving a second scaled transform coefficient for the second coding unit within the first slice of coding units using the quantization parameter as modified using the delta value stored in association with the second coding unit; and
   decoding the second coding unit within the first slice of coding units using the second scaled transform coefficient.

3. The computer-implemented method of claim 2,
   further comprising determining whether a quantization parameter value of a left neighboring quantization group of the second coding unit is available;
   selecting a previous quantization parameter, wherein the previous quantization parameter is selected from a left neighboring quantization group of the second coding unit when a quantization parameter value of the left neighboring quantization group is available and is selected from a quantization group decoded previous to the left neighboring quantization group when the quantization parameter value of the left neighboring quantization group is not available;
   wherein the delta value stored in associated with the second coding unit is derived at least in part from the previous quantization parameter.

\* \* \* \* \*